United States Patent

Grauman et al.

(10) Patent No.: US 9,176,993 B2
(45) Date of Patent: Nov. 3, 2015

(54) EFFICIENTLY IDENTIFYING IMAGES, VIDEOS, SONGS OR DOCUMENTS MOST RELEVANT TO THE USER USING BINARY SEARCH TREES ON ATTRIBUTES FOR GUIDING RELEVANCE FEEDBACK

(71) Applicant: Board of Regents, The University of Texas System, Austin, TX (US)

(72) Inventors: Kristen Grauman, Austin, TX (US); Adriana Kovashka, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 192 days.

(21) Appl. No.: 13/965,677

(22) Filed: Aug. 13, 2013

(65) Prior Publication Data

US 2014/0188901 A1   Jul. 3, 2014

Related U.S. Application Data

(60) Provisional application No. 61/748,509, filed on Jan. 3, 2013.

(51) Int. Cl.
*G06F 17/30* (2006.01)
(52) U.S. Cl.
CPC ................................ *G06F 17/30274* (2013.01)
(58) Field of Classification Search
CPC combination set(s) only.
See application file for complete search history.

(56) References Cited

U.S. PATENT DOCUMENTS

| | | |
|---|---|---|
| 7,878,390 B1 | 2/2011 | Batten et al. |
| 2001/0056415 A1 | 12/2001 | Zhu et al. |
| 2003/0063779 A1 | 4/2003 | Wrigley |
| 2004/0068486 A1 | 4/2004 | Chidlovskii |
| 2005/0055344 A1 | 3/2005 | Liu et al. |
| 2005/0154686 A1 | 7/2005 | Corston et al. |
| 2011/0210978 A1* | 9/2011 | Sara et al. ...................... 345/592 |
| 2011/0313548 A1 | 12/2011 | Taylor et al. |

OTHER PUBLICATIONS

Kovashka et al., "WhittleSearch: Image Search with Relative Attribute Feedback," Proceedings of the IEEE Conference on Computer Vision and Pattern Recognition (CVPR), Jun. 2012.

Parikh et al., "Relative Attributes," Proceedings of the International Conference on Computer Vision (ICCV), Barcelona, Spain, Nov. 2011.

(Continued)

*Primary Examiner* — Etienne Leroux
(74) *Attorney, Agent, or Firm* — Robert A. Voigt, Jr.; Winstead, P.C.

(57) ABSTRACT

A method, system and computer program product for efficiently identifying images, videos, audio files or documents relevant to a user using binary search trees in attribute space for guiding relevance feedback. A binary tree is constructed for each relative attribute of interest. A "pivot exemplar" (at a node of the binary tree) is set for each relative attribute's binary tree as corresponding to the database image, video, audio file or document with a median relative attribute value among that subtree's child examples. A pivot exemplar out of the available current pivot exemplars that has the highest expected information gain is selected to be provided to the user. Comparative attribute feedback is then received from the user regarding whether a degree of the attribute in the user's target image, video, audio file or document is more, less or equal with the attribute displayed in the selected pivot exemplar.

24 Claims, 5 Drawing Sheets

(56) References Cited

OTHER PUBLICATIONS

Kumar et al., "Face Tracer: A Search Engine for Large Collections of Images with Faces," Proceedings of the 10th European Conference on Computer Vision (ECCV), pp. 340-353, Oct. 2008.
Siddiquie et al., Image Ranking and Retrieval Based on Multi-Attribute Queries, IEEE Conference on Computer Vision and Pattern Recognition (CVPR), pp. 801-808, Jun. 20-25, 2011.
John C. Platt, "Probabilistic Outputs for Support Vector Machines and Comparisons to Regularized Likelihood Methods," Advances in Large Margin Classifiers, Mar. 26, 1999.
U.S. Patent Application entitled "Efficiently Identifying Images, Videos, Songs or Documents Most Relevant to the User Based on Attribute Feedback," filed with U.S. Patent Office on Aug. 13, 2013.
Search Report and Written Opinion for International Application No. PCT/US13/54717 dated Feb. 21, 2014, pp. 1-14.
Search Report and Written Opinion for International Application No. PCT/US13/54700 dated Feb. 27, 2014, pp. 1-7.
Chen et al., "Less is More, Probabilistic Models for Retrieving Fewer Relevant Documents," http://citeseerx.ist.psu.edu/viewdoc/download?doi=10.1.1.125.2701&rep=rep1&type=pdf, SIGIR'06, Aug. 6-11, 2006, pp. 1-8.
Trotman et al., "Identifying and Ranking Relevant Document Elements," 2003, pp. 1-5.
International Preliminary Report on Patentability for International Application No. PCT/US2013/054717 dated Jul. 16, 2015, pp. 1-7.
International Preliminary Report on Patentability for International Application No. PCT/US2013/054700 dated Jul. 16, 2015, pp. 1-6.
Kovashka et al., "WhittleSearch: Image Search with Relative Attribute Feedback," Proceedings of the IEEE Conference on Computer Vision and Pattern Recognition (CVPR), Jun. 16-21, 2012, pp. 2973-2980.
Office Action for U.S. Appl. No. 13/965,594 dated Sep. 3, 2015, pp. 1-35.

* cited by examiner

EFFICIENTLY IDENTIFYING IMAGES, VIDEOS, SONGS OR DOCUMENTS MOST RELEVANT TO THE USER USING BINARY SEARCH TREES ON ATTRIBUTES FOR GUIDING RELEVANCE FEEDBACK

CROSS-REFERENCE TO RELATED APPLICATIONS

This application is related to the following commonly owned co-pending U.S. patent application:

Provisional Application Ser. No. 61/748,509, "Efficiently Identifying Images Most Relevant to the User Using Binary Search Trees on Visual Attributes for Guiding Relevance Feedback," filed Jan. 3, 2013, and claims the benefit of its earlier filing date under 35 U.S.C. §119(e).

GOVERNMENT INTERESTS

The U.S. Government has certain rights in this invention pursuant to the terms of the Office of Naval Research Grant No. N00014-11-1-0105P00003.

TECHNICAL FIELD

The present invention relates to information retrieval, and more particularly to efficiently identifying images (e.g., photographs, illustrations, online products), videos, audio files or documents that are most relevant to the user using binary search trees on attributes for guiding relevance feedback.

BACKGROUND

In information retrieval, users have a mental picture of content, such as images, desired to be retrieved. For example, a shopper wants to retrieve those catalog pages that match his/her envisioned style of clothing. In another example, a witness wants to help law enforcement locate a suspect in a database based on his/her memory of the face of the suspect. In a further example, a web page designer wants to find a stock photograph suitable for his/her customer's brand image. Oftentimes, such images are attempted to be retrieved based on simple keyword searching. However, such content or images (e.g., illustrations, photographs, products) are not easily identified and retrieved based on simple keyword searching In a similar manner, in other domains, such as video, document, or music retrieval, it is difficult to accurately meet a user's search needs if relying on keyword search alone.

As a result, interactive search techniques have been developed to attempt to identify and retrieve the content envisioned by the user by allowing the user to iteratively refine the results retrieved by the system. The basic idea in such techniques is to show the user candidate results, obtain feedback, and adapt the system's relevance ranking function accordingly. However, existing retrieval methods provide only a narrow channel of feedback to the system. Typically, a user refines the retrieved images (or videos, audio files, or documents) by providing binary relevance feedback (i.e., informing the system which examples are "relevant" or "irrelevant") on exemplars provided to the user, or else attempts to tune the system parameters, such as weights on a small set of low-level features (e.g., texture, color and edges in the case of image searches). The latter is clearly a burden for a user who likely cannot understand the inner workings of the algorithm. The former feedback is more natural to supply, yet it leaves the system to infer what about those images the user found relevant or irrelevant, and therefore can be slow to converge on the user's envisioned content in practice.

A further deficiency in interactive search techniques involves the examples (images, videos, audio files, or documents) that are selected to be provided to the user for feedback. Typically, the system simply displays a screen full of top-ranked examples, leaving a user free to provide feedback on any of them. This strategy has the appeal of simultaneously showing the current results and accepting feedback. However, the examples believed to be the most relevant need not be the most informative for reducing the system's uncertainty in selecting the examples that are the closest to the user's envisioned image. As a result, the approach may fail to explore relevant portions of the feature space, and can waste interaction cycles eliciting redundant feedback. Hence, such techniques are inefficient in terms of the system's selection time as well as the user's feedback effort as a result of not providing examples to the user for which feedback would be most informative for reducing the system's uncertainty (i.e., improve the system's notion of relevance).

BRIEF SUMMARY

In one embodiment of the present invention, a method for efficiently identifying images, videos, audio files or documents relevant to a user using attribute binary trees for guiding relevance feedback comprises constructing a binary search tree for each relative attribute of interest in a pool of database images, videos, audio files or documents. The method further comprises recursively setting a current pivot exemplar for each binary tree as corresponding to a database image, video, audio file or document with a median relative attribute value among all remaining database items in a sub-tree. Furthermore, the method comprises predicting the information gain that would result from asking a user how a user's target image, video, audio file or document compares to each pivot exemplar of a plurality of pivot exemplars, where the comparison is made in terms of an attribute associated with that pivot's binary tree. Additionally, the method comprises providing a pivot exemplar deemed most informative from among the plurality of pivot exemplars to a user to provide a comparison between the attribute in the user's target image, video, audio file or document and in the current pivot exemplar. In addition, the method comprises receiving, by a processor, comparative attribute feedback from the user regarding whether a degree of the attribute in the user's target image, video, audio file or document is more, less or equal with the attribute displayed in the provided pivot exemplar.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

Figure 1:
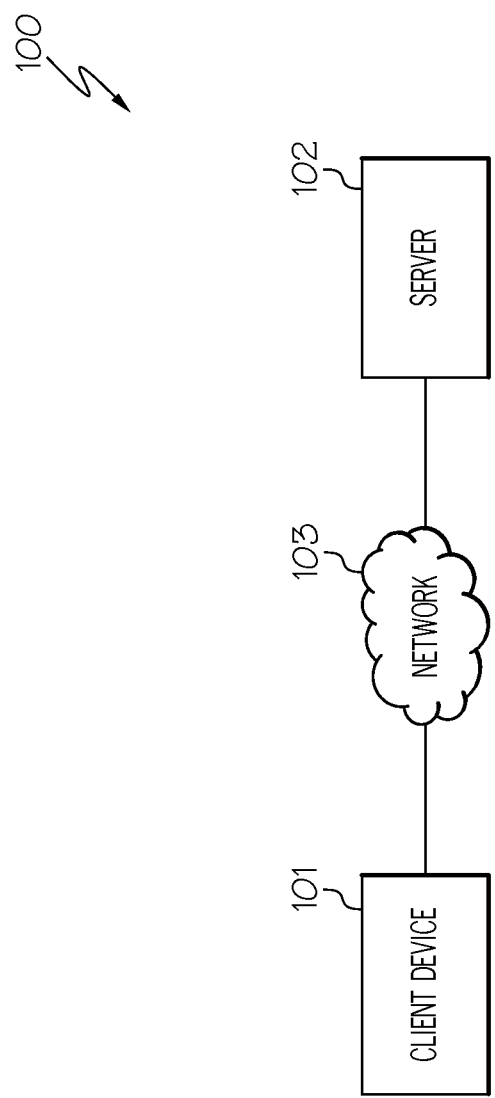
FIG. 1 illustrates a network system configured in accordance with an embodiment of the present invention.

The present invention comprises a method, system and computer program product for efficiently identifying examples most relevant to a user using binary trees computed over relative attributes for guiding relevance feedback. The "examples," as used herein, could be images, videos, documents, or audio files, or similar multi-media data objects. In one embodiment of the present invention, a binary tree is constructed for each relative attribute of interest in a pool of database examples. A set of "pivot exemplars" is recursively determined for each attribute's binary tree as corresponding to the database examples with a median relative attribute value among their associated examples, where each "pivot exemplar" is an internal node of the binary tree. Furthermore, a selection function predicts the information gain that would result from asking a user how a user's target example compares to the pivot exemplar for the relative attribute of interest for its corresponding binary tree. A specific pivot exemplar from the pivot exemplars is then provided to the user to provide a comparison between an attribute in the user's target (i.e., the image, video, document, or audio file he/she would like to find) and that specific pivot exemplar, where the specified pivot exemplar is the pivot exemplar among all binary trees with the highest expected information gain. Comparative attribute feedback is then received from the user regarding whether the degree of the attribute in the user's target is more, less or equal in strength with the attribute displayed in the specified pivot exemplar. In this manner, the interactive search becomes more efficient thereby reducing the system's selection time as well as the user's feedback effort. In particular, the selection time is reduced since information gain computation is limited to only the pivot examples, while the user's feedback effort is reduced because the user need only respond to the most useful comparative questions that are expected to lead to his/her target.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

While the following discusses the present invention in connection with image searching, the principles of the present invention may be applied to other information retrieval tasks, such as video searching, document searching (e.g., navigating through news articles using semantic attribute feedback about text topics) and music searching (e.g., finding an audio file using semantic attribute feedback about audio properties like mood, tempo, etc.). A person of ordinary skill in the art would be capable of applying the principles of the present invention to such implementations. Further, embodiments applying the principles of the present invention to such implementations would fall within the scope of the present invention.

An "attribute," as used herein, refers to a property that is often shared among different objects and can be described or named by a human viewer. For example, visual attributes for shoes may include "shininess" or "heel height." In another example, visual attributes for a scene may include "rainy" or "dark." Similarly, an audio attribute may include "tempo" or "mood." Similarly, a document attribute for a news article may include "cheerful tone" or "negative sentiment" or "conservativeness."

Referring now to the Figures in detail, FIG. 1 illustrates a network system 100 for practicing the principles of the present invention in accordance with an embodiment of the present invention. Network system 100 includes a client device 101 connected to a server 102 via a network 103. Client device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to network 103 and consequently communicating with server 102. Such communication includes, but is not limited to, providing relevance feedback (e.g., looking for more, less or equally of the attribute shown in an image) to an application of server 102 configured to identify images (e.g., photographs, illustrations, online products, documents, videos, audio files) that are most relevant to the user of client device 101 using binary search trees on attributes for guiding relevance feedback. A description of the hardware configuration of server 102 is provided below in connection with FIG. 2.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

While FIG. 1 illustrates a single client device 101, server 102 and network 103, network system 100 may include any number of client devices 101, servers 102 and networks 103. The embodiments of network system 100 are not to be limited in scope to the depiction of FIG. 1.

Figure 2:
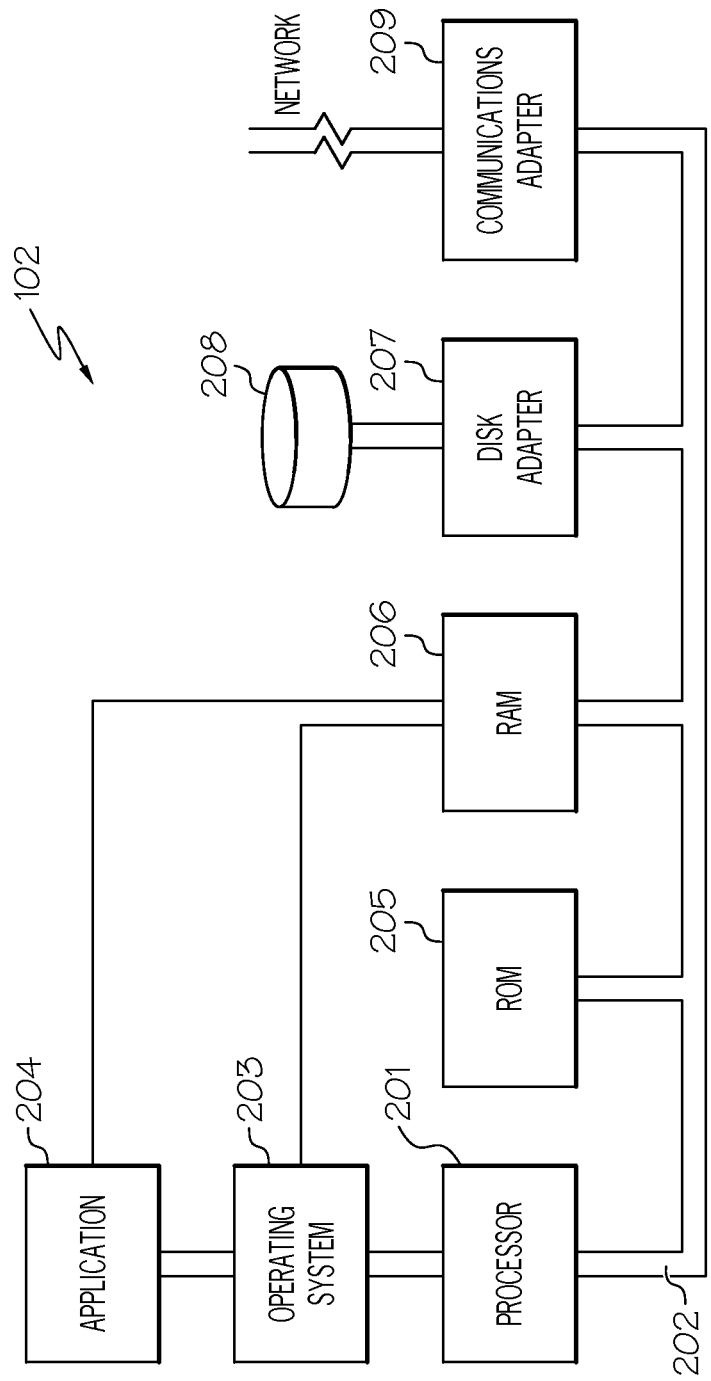
FIG. 2 illustrates a hardware configuration of a server configured in accordance with an embodiment of the present invention.

Referring now to FIG. 2, FIG. 2 illustrates a hardware configuration of server 102 (FIG. 1) which is representative of a hardware environment for practicing the present invention. Server 102 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, an application for identifying images (e.g., photographs, illustrations, online products) that are most relevant to the user of client device 101 using binary search trees on visual attributes for guiding relevance feedback as discussed further below in association with FIGS. 3A-3B and 4.

Referring again to FIG. 2, read-only memory ("ROM") 205 is coupled to system bus 202 and includes a basic input/output system ("BIOS") that controls certain basic functions of server 102. Random access memory ("RAM") 206 and disk adapter 207 are also coupled to system bus 202. It should be noted that software components including operating system 203 and application 204 may be loaded into RAM 206, which may be server's 102 main memory for execution. Disk adapter 207 may be an integrated drive electronics ("IDE") adapter that communicates with a disk unit 208, e.g., disk drive. It is noted that the application for identifying images (e.g., photographs, illustrations, online products) that are most relevant to the user of client device 101 using binary search trees on visual attributes for guiding relevance feedback, as discussed further below in association with FIGS. 3A-3B and 4, may reside in disk unit 208 or in application 204.

Server 102 may further include a communications adapter 209 coupled to bus 202. Communications adapter 209 interconnects bus 202 with an outside network (e.g., network 103 of FIG. 1) thereby enabling server 102 to communicate with other client devices 101.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, interactive search techniques have been developed to attempt to identify and retrieve the content envisioned by the user by allowing the user to iteratively refine the results retrieved by the system. The basic idea in such techniques is to show the user candidate results, obtain feedback, and adapt the system's relevance ranking function accordingly. However, existing image search methods provide only a narrow channel of feedback to the system. Typically, a user refines the retrieved images via binary feedback ("relevant" or "irrelevant") on the examples (e.g., images, videos, documents, music) provided to the user or else attempts to tune the system parameters, such as weights on a small set of low-level features (e.g., texture, color and edges in the case of image searches). The latter is clearly a burden for a user who likely cannot understand the inner workings of the algorithm. The former feedback is more natural to supply, yet it leaves the system to infer what about those images the user found relevant or irrelevant, and therefore can be slow to converge on the user's envisioned content in practice.

A further deficiency in such search techniques involves the examples (e.g., images) that are selected to be provided to the user for feedback. Often, the system simply displays a screen full of top-ranked examples, leaving a user free to provide feedback on any of them. This strategy has the appeal of simultaneously showing the current results and accepting feedback. However, the examples believed to be most relevant need not be most informative for reducing the system's uncertainty. As a result, the approach may fail to explore relevant portions of the feature space, and can waste interaction cycles eliciting redundant feedback. Hence, such techniques are inefficient in terms of the system's selection time as well as the user's feedback effort as a result of not providing examples to the user to provide feedback that is the most informative for reducing the system's uncertainty (i.e., those that would improve the system's notion of relevance).

Figure 3A:
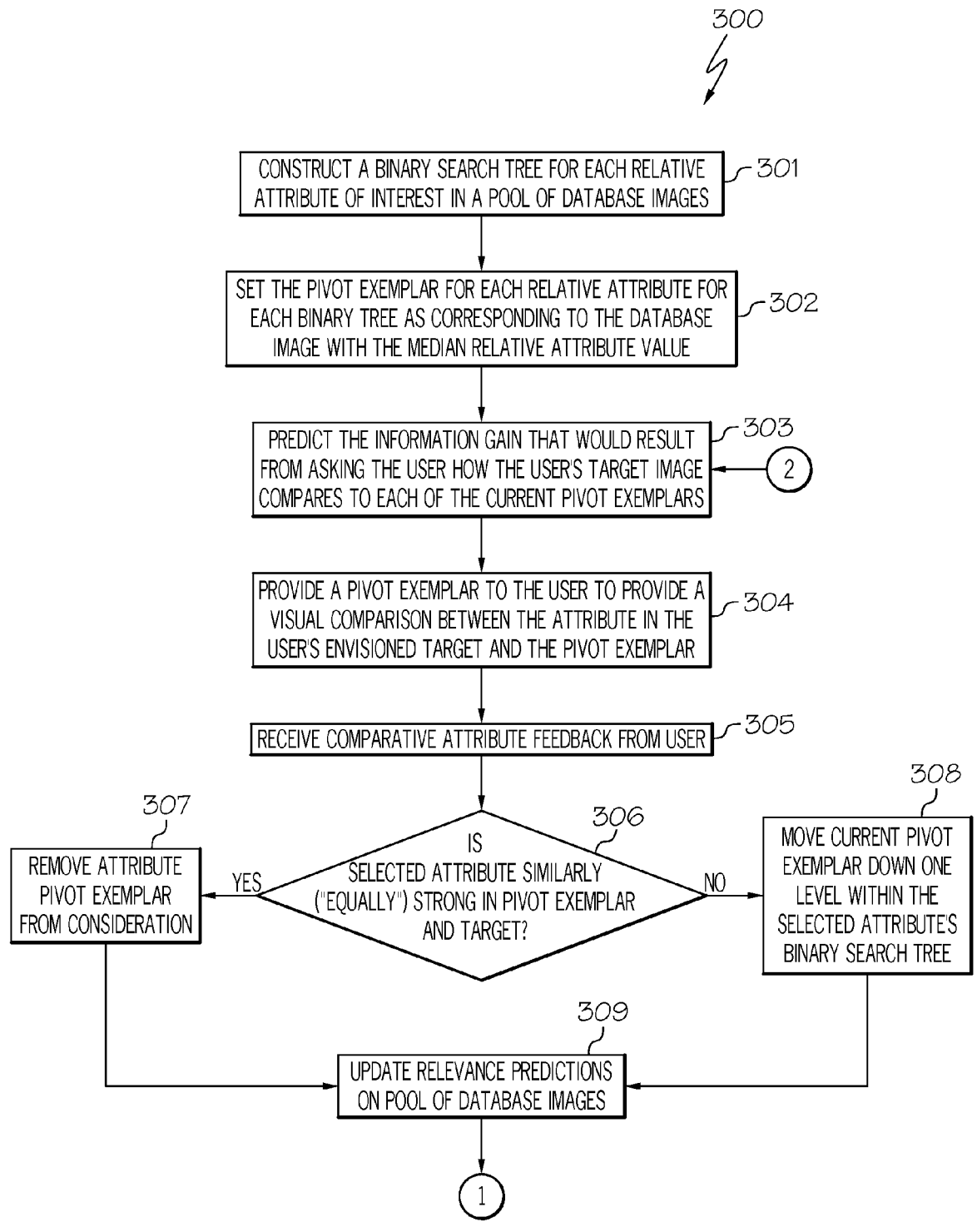
FIGS. 3A-3B are a flowchart of a method for efficiently identifying images most relevant to a user using binary search trees on attributes for guiding relevance feedback in accordance with an embodiment of the present invention.
Figure 3B:
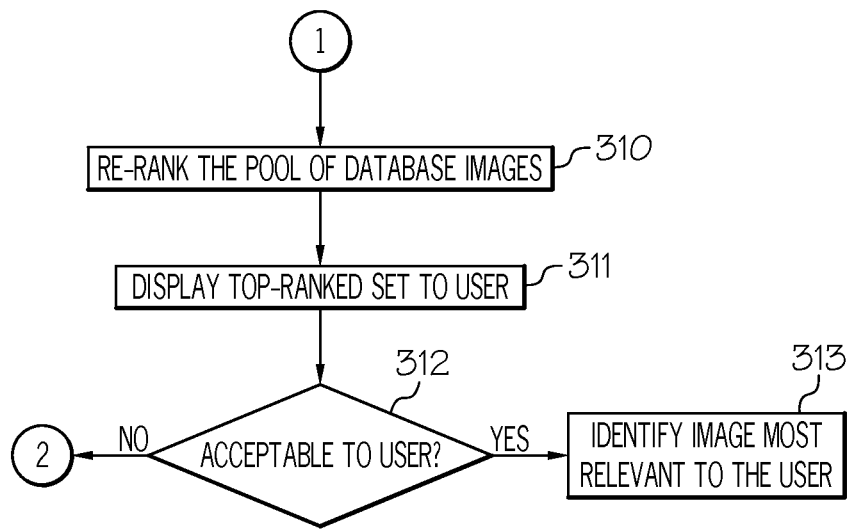
Figure 4:
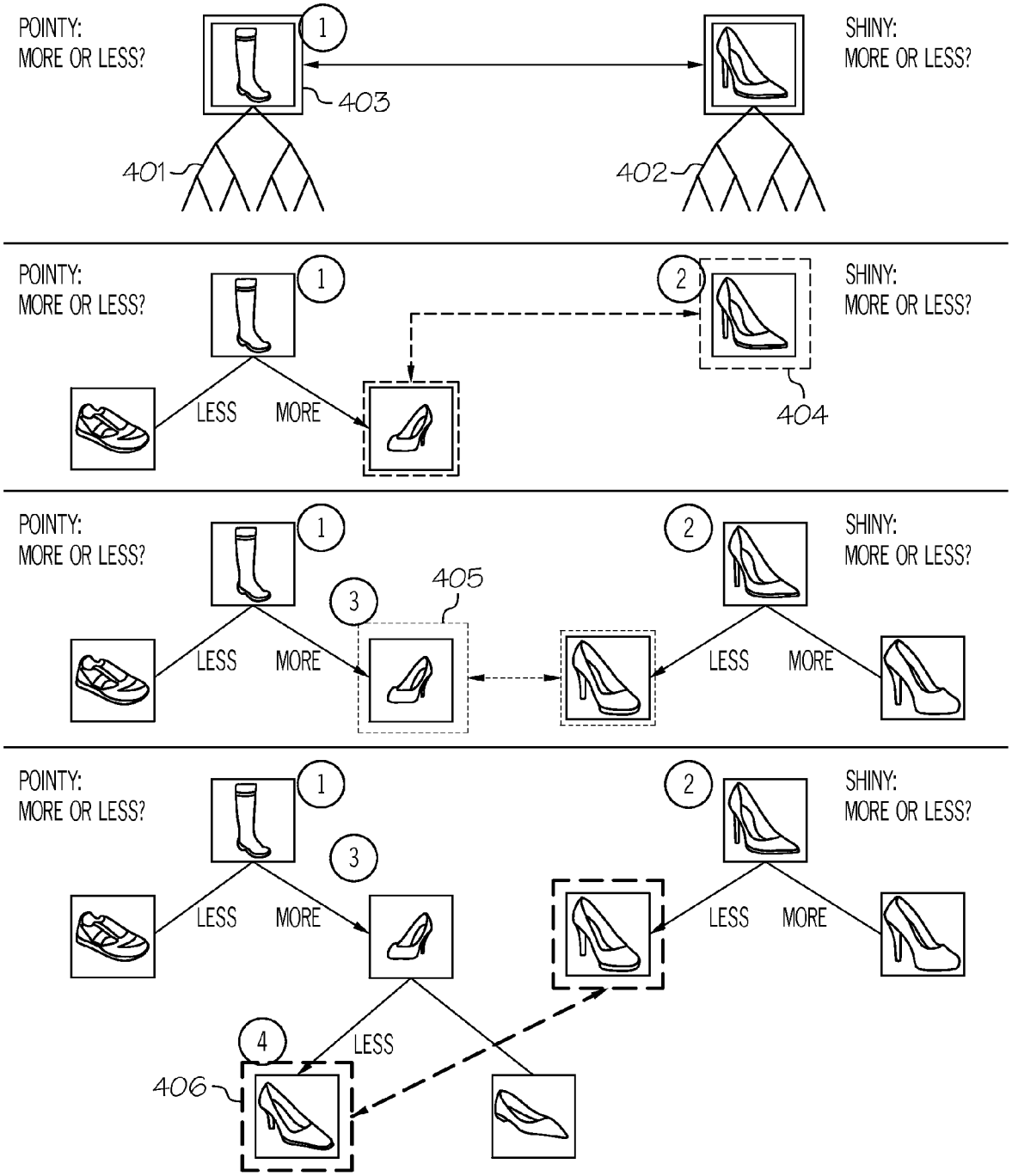
FIG. 4 illustrates requesting feedback from the user using binary search trees on attributes to focus the active selection in accordance with an embodiment (in this embodiment, the application is image search) of the present invention.

The principles of the present invention provides a means for efficiently identifying images (e.g., photographs, illustrations, online products) or videos, documents, or audio files, that are most relevant to the user using binary search trees on attributes for guiding relevance feedback as discussed further below in association with FIGS. 3A-3B and 4. FIGS. 3A-3B are a flowchart of a method for efficiently identifying examples that are most relevant to the user using binary search trees on attributes for guiding relevance feedback. FIG. 4 illustrates requesting feedback from the user using binary search trees on attributes to focus the active selection, for the case of image retrieval, where examples are images.

As stated above, FIGS. 3A-3B are a flowchart of a method 300 for efficiently identifying images most relevant to a user, such as a user of client device 101 (FIG. 1), using binary search trees on attributes for guiding relevance feedback in accordance with an embodiment of the present invention.

Prior to discussing method 300, a brief discussion of the image search approach of the present invention interacting with the user of client device 101 is deemed appropriate.

The information retrieval approach of the present invention interacts with the user through multiple-choice questions of the form: "Is the item you are looking for more, less, (or equally) A than item I?", where A is a semantic attribute and I is an exemplar from the database being searched. Again, the items might be images, documents, audio files, videos, or other similar multi-media objects. The goal of the present invention is to generate a series of such questions that will most efficiently narrow down the relevant items in the database, so that the user of client device 101 finds his/her target (referring to the imagined content of the user of client device 101) in few iterations. To this end, at each iteration, a comparison for the user to provide is actively selected, that is, the (A,I) pair which yields the expected maximal information gain. Rather than exhaustively search all database images as potential exemplars, however, only a small number of "pivot exemplars" is considered, where the "pivot exemplars" refer to selected internal nodes of the binary search trees constructed for each attribute. The output is the list of database images, sorted by their predicted relevance.

The term "target," as used herein, refers to the imagined content of the user of client device 101. For example, in image search, it could be a literal image the user has seen before, or simply a mental model of the visual content of interest. In the following, let $I=\{I_1, \ldots, I_N\}$ denote the N images in the database, each of which has a corresponding image descriptor $x_1, \ldots x_N$ (e.g., GIST, bag of words, etc.). Furthermore, it is further supposed that there is an attribute vocabulary consisting of M properties For example, for a shoe shopping database, the visual properties might be "pointiness," "shininess," "heel height," etc. For a music database, the audio properties might be "tempo," "mood," etc. $A_m(I_i)$ is used to denote the true strength of an attribute m in example $I_i$, i.e., as would be perceived by a human viewer.

Referring now to FIG. 3A, in conjunction with FIGS. 1-2, in step 301, server 102 constructs a binary search tree for reach relative attribute of interest (e.g., "pointiness," "shininess") in a pool of database images, documents, audio files or videos.

In order to utilize attribute-based comparisons, the strength of each attribute in each database example needs to be estimated. Those estimates can be either automatically machine estimated or manually annotated by humans. In one embodiment, to form machine estimates of the attribute strengths, one ranking function per attribute is learned. In one embodiment, such a ranking function is learned as follows. For each attribute m, a set of ordered pairs $O_m=\{I_i,I_j\}$ is obtained for which each image $I_i$ has greater strength of attribute m than image $I_j$ does, as well as a set of unordered pairs $E_m=\{I_i,I_j\}$, for which both images in a pair exhibit the attribute equally. All such pairs come from comparative human judgments.

For each attribute m, its associated training pairs are used to learn a ranking function:

$$a_m(I_i)=w_m^T x_i, \quad (EQ\ 1)$$

which maps the descriptor $x_i$ for example $I_i$ to its real-valued attribute strength. The projection parameters $w_m$ are optimized using a large-margin ranking objective. It aims to satisfy the ordered pair constraints above, such that $$w_m^T x_i > w_m^T x_j, \forall (I_i, I_j) \in O_m,$$

and $$w_m^T x_i \approx w_m^T x_j, \forall (I_i, I_j) \in E_m,$$

while at the same time maintaining a wide margin in the output ranks of the nearest training examples. The principles of the present invention are not limited to the use of the above-identified ranking function and may incorporate the use of alternative rank learning methods to represent the attributes, or alternative learning paradigms, such as classification or regression. Furthermore, as stated above, the attribute values can alternatively be manually assigned through human annotations.

It is noted that these predicted attribute values $a_m(I_i)$ are what can be observed for example $I_i$. They are a function of (but can be distinct from) the "true" latent attribute strengths $A_m(I_i)$, meaning the attribute strengths as perceived by a human user.

For each attribute m=1, . . . M, a binary search tree is constructed. The tree recursively partitions all the database examples into two balanced sets, where the key at a given node is the median relative attribute value occurring within the set of examples passed to that node. To build the m-th attribute tree, we start at the root with all database examples, sort them by their attribute values $a_m(I_i), \ldots a_m(I_N)$, and identify the median value.

In step 302, server 102 sets each pivot exemplar for each attribute for each binary tree as corresponding to the database example with the median relative attribute value, where a pivot exemplar is an internal node the binary tree. For example, let $I_p$ denote the "pivot" image—the one that has the median attribute strength for a subtree for attribute m. Those images exhibiting the attribute less than $I_p$, i.e., all $I_i$ such that $a_m(I_i) \le a_m(I_p)$, are passed to the left child, while those exhibiting the attribute more, i.e., $a_m(I_i) > a_m(I_p)$, are passed to the right child. Then the splitting repeats recursively, each time storing the next pivot image and its relative attribute value at the appropriate node.

It is noted that in one embodiment, both the relative attribute ranker training and the search tree construction are offline procedures; they are performed once, before handling any user queries.

It is further noted that a search procedure could be performed that walks a user through one such attribute tree, at each successively deeper level requesting a comparison to the pivot, and then eliminating the appropriate portion of the database depending on whether the user says "more" or "less." In another embodiment, a probabilistic representation of whether images satisfy the comparison constraints is proposed, and the pivots are used to limit the pool of candidate images that are evaluated for their expected information gain.

In step 303, starting at the root of the binary search trees, server 102 predicts the information gain that would result from asking the user how the user's target compares to each of the current pivot exemplars (where there is one current pivot exemplar per binary tree). To compute the expected gain, methods were devised (discussed further below) to estimate the likelihood of the user's response given the feedback history. Then, among the pivot exemplars, the most informative comparison is requested, generating a question to the user, such as "Is your target more or less (or equally) [attribute name] than this image?", where [attribute name] refers to the algorithm-selected attribute for the pivot with the most information gain expected. The analogous questions are generated for the case of audio files, videos or documents.

In step 304, server 102 provides a pivot exemplar to the user of client device 101 to provide a comparison between the attribute in the user's envisioned target and that pivot exemplar. The pivot exemplar provided to the user is the pivot exemplar among all the binary trees deemed to provide the most informative comparison as discussed above. At the first iteration, those pivots would all be the root nodes; at subsequent iterations, they would also consist of internal nodes in the binary trees. Thus, at each iteration, as discussed further below, the user provides a comparison between the attribute in the user's envision target and the appropriate pivot exemplar.

In one embodiment, a set of M current pivot examples (one per attribute tree) at each iteration is maintained, denoted $P = \{I_{p1}, \ldots, I_{pM}\}$. The pivots are initially the root pivot examples from each tree. During active selection, the goal is to identify the pivot in this set that, once compared by the user to his target, will most reduce the entropy of the relevance predictions on all database examples in I. It is noted that selecting a pivot corresponds to selecting both an example as well as an attribute along which we want it to be compared. That is, $I_{pm}$ refers to the pivot for attribute m. Pivots will have a different impact due to the distribution of values in the corresponding attribute's spectrum.

Let $y_i \{1, 0\}$ denote the binary label for database example $I_i$, which reflects whether it is relevant to the user (matches his/her target), or not. Let $\mathcal{F} = \{(I_{p_m}, r)_k\}_{k=1}^T$ denote the set of comparative constraints accumulated in the T rounds of feedback so far. The k-th item in F consists of a pivot example $I_{pm}$ for attribute m, and a user response $r \in \{\text{"more;" "less;" "equally"}\}$. The final output will be a sorting of the database examples in I according to their probability of relevance, given the example's content and all user feedback: $P(y_i = 1 | I_i, \mathcal{F})$ Given the feedback history F, the information gain should be predicted across all N database images for each pivot in P. In one embodiment, the pivot selected is the one that most reduces the total relevance entropy over all images—or the pivot that minimizes the expected entropy when used to augment the current set of feedback constraints.

The entropy based on the feedback thus far is:

$$H(\mathcal{F}) = -\sum_{i=1}^{N} \sum_{\ell} P(y_i = \ell | I_i, \mathcal{F}) \log P(y_i = \ell | I_i, \mathcal{F}), \quad (\text{EQ 2})$$

where $\ell \in \{0, 1\}$. Let R be a random variable denoting the user's response, $R \in \{\text{"more," "less," "equally"}\}$. The next pivot for comparison is selected as:

$$I_p^* = \arg\min_{I_{pm} \in P} \sum_r P(R = r | I_{pm}, \mathcal{F}) H(\mathcal{F} \cup (I_{pm}, r)). \quad (\text{EQ 3})$$

Optimizing EQ 3 requires estimating the likelihood of each of the three possible user responses to a question that has not been issued yet. Three possible strategies may be used to estimate it. In each case, cues are used from the available feedback history to form a "proxy" for the user, essentially borrowing the probability that a new constraint is satisfied from previously seen feedback. For the first strategy, which is referred to herein as the "All Relevant," all relevant database examples are used as the proxy. The assumption is that the examples that are relevant to the user thus far are (on the whole) more likely to satisfy the user's next feedback than those that are irrelevant. Ideally, the $P = (S_{c,i} = 1 | I_i)$ values are averaged among only the relevant images $I_i$, where c indexes the candidate new feedback for a (yet unknown) user response R. Since relevance can only be predicted, the weighted probability of each possible response R is computed:

$$P_{all}(R = r | I_{pm}, \mathcal{F}) = \frac{1}{N} \sum_{i=1}^{N} P(y_i = 1 | I_i, \mathcal{F}) P(S_{c,i} = 1 | I_i), \quad (\text{EQ 4})$$

where the all subscript stands for All Relevant.

The second strategy, which is referred to herein as the "Most Relevant," is similar, but uses only our current best guess for the target as the proxy:

$$P_{most}(R = r | I_{p_m}, \mathcal{F}) = P(S_{c,b} = 1 | I_b), \quad (\text{EQ 5})$$

where $I_b$ is the database example that maximizes $P(y_i = 1 | I_i, \mathcal{F})$, for $i = 1, \ldots, N$.

The third strategy, referred to herein as the "Similar Question," examines all previously answered feedback requests, and copies the answer from the question that is most similar to the new one. Question similarity is defined in terms of the Euclidean distance between the pivot examples' descriptors plus the similarity of the two attributes involved in either question. For images, the descriptors would capture some visual properties, such as edges, color, or texture. The latter is quantified by the Kendall's τ correlation between the ranks they assign to a set of validation examples. For example, this reflects that "feminine" and "heel height" are more aligned than "feminine" and "grayness." Let R denote the response to the most similar question k found in the history F for the new pivot $I_{pm}$ under consideration. Then the following defines the likelihood of a response under the "Similar Question" model:

$$P_{question}(R = r \mid I_{pm}, \mathcal{F}) = \begin{cases} 1 & \text{if } r = r_k^* \\ 0 & \text{otherwise} \end{cases}. \quad (\text{EQ 6})$$

At each iteration, the user is presented with the pivot exemplar selected with Equation (EQ 3) and the system requests the specified attribute comparison. Then, (1) the response is used to update F with that additional example-attribute-response constraint, and (2) either the pivot in P for that attribute is replaced with its appropriate child pivot (i.e., the left or right child in the binary search tree if the response is "less" or "more," respectively) or the exploration of this tree (if the response is "equally") is terminated. It is noted that this means that the set of pivots consists of pointers into the binary trees at varying levels as illustrated in FIG. 4.

Referring to FIG. 4, FIG. 4 illustrates requesting feedback from the user using binary search trees on visual attributes to focus the active selection in accordance with an embodiment of the present invention. As illustrated in FIG. 4, M=2 attribute trees 401, 402, where the user of client device 101 is asked to compare his/her target to pivot 403 in terms of "pointiness" and is then asked to compare his/her target to pivot 404 in terms of "shininess" followed by being asked to compare his/her target to pivot 405 in terms of "pointiness" and so on (such as being asked to compare his/her target to pivot 406 in terms of "pointiness").

By using binary search trees on attributes to guide relevance feedback from the user, the system's selection time as well as the user's feedback effort are improved. The user's effort is saved because the active selection criterion considers which attribute will most benefit from more refined feedback at any point in time. In another embodiment, the system alternates between the attribute trees in sequence without computing information gain. This is more efficient, though depending on the data distribution, it may not reduce uncertainty as efficiently.

Referring to FIG. 3A, in conjunction with FIGS. 1 and 2, in step 305, server 102 receives comparative attribute feedback ("more," "less," "equally") from the user of client device 101 regarding whether a degree of the attribute in the user's target is "more," "less" or "equal" with the attribute displayed in the presented pivot exemplar (e.g., "more shiny than depicted in the pivot exemplar") as discussed above in connection with FIG. 4.

In step 306, a determination is made by server 102 as to whether the user indicated that the degree of the attribute (e.g., pointedness) in the user's target (e.g., shoe) is equal with the attribute displayed in the presented pivot exemplar. If the user indicated that the degree of the attribute (e.g., pointedness) in the user's target image (e.g., shoe) is equal with the attribute displayed in the presented pivot exemplar, then, in step 307, server 102 removes the presented pivot exemplar from consideration.

If, however, the user indicated that the degree of the attribute (e.g., pointedness) in the user's target (e.g., shoe) is not equal (i.e., more or less) with the attribute displayed in the presented pivot exemplar, then, in step 308, server 102 moves the current pivot exemplar down one level within the selected attribute's binary search tree as discussed above in connection with FIG. 4.

Upon removing the attribute pivot from consideration or upon moving the current pivot exemplar down one level within the selected attribute's binary search tree, in step 309, server 102 updates the relevance predictions in the examples stored in the database. The following is a discussion for predicting the relevance of a database example, given the user's comparative feedback.

Let $S_{k,i} \in \{0,1\}$ be a binary random variable representing whether image $I_i$ satisfies the k-th feedback constraint. For example, if the user's k-th comparison yields response r="more," then $S_{k,i}=1$ if the database image $I_i$ has attribute m more than the corresponding pivot image $I_{pm}$. The probability of relevance is thus the probability that all T feedback comparisons in F are satisfied:

$$P(y_i = 1 \mid I_i, \mathcal{F}) = \prod_{k=1}^{T} P(S_{k,i} = 1 \mid I_i) \quad (\text{EQ 7})$$

For numerical stability, in our implementation, the product above is replaced with a sum of log probabilities.

The probability that an individual constraint is satisfied given that the user's response was r for pivot $I_{pm}$ is:

$$P(S_{k,i} = 1 \mid I_i) = \begin{cases} P(A_m(I_i) > A_m(I_p)) & \text{if } r = \text{"more"} \\ P(A_m(I_i) < A_m(I_p)) & \text{if } r = \text{"less"} \\ P(A_m(I_i) = A_m(I_p)) & \text{if } r = \text{"equally"} \end{cases} \quad (\text{EQ 8})$$

To estimate these probabilities, the attribute predictions $a_m(\bullet)$ are mapped to probabilistic outputs, by adapting Platt's method (found in J. C. Platt, "Probabilistic Output for Support Vector Machines and Comparisons to Regularized Likelihood Methods," Mar. 26, 1999, which is incorporated herein by reference in its entirety) to the paired classification problem implicit in the large-margin ranking objective. Specifically, this yields:

$$P(A_m(I_i) > A_m(I_p)) = \frac{1}{1 + \exp(\alpha_m(\alpha_m(I_i) - \alpha_m(I_p)) + \beta_m)} \quad (\text{EQ 9})$$

$$P(A_m(I_i) = A_m(I_p)) = \frac{1}{1 + \exp(\gamma_m \mid \alpha_m(I_i) - \alpha_m(I_p) \mid + \delta_m)}, \quad (\text{EQ 10})$$

where the sigmoid parameters are learned using the sets $O_m$ and $E_m$ from above. In particular, to learn $\alpha_m$ and $\beta_m$, pairs with "more" judgments from $O_m$ as positive paired-instances, and "less" judgments as negative instances are used. For $\gamma_m$ and $\delta_m$, "equally" pairs from $E_m$ are used as positive labels, and both "more" and "less" responses from $O_m$ as negative instances.

$P(A_m(I_i) < A_m(I_p))$ equals $1 - P(A_m(I_i) > A_m(I_p))$. When estimating the likelihood of a user response, these values are normalized so the three probabilities ("more," "less," "equally") sum to 1.

The probabilistic model of relevance of the present invention accounts for the fact that predicted attribute values can deviate from true perceived attribute strengths to some extent. In contrast, prior work using relative attribute feedback makes hard cuts in the attribute feature space, simply counting how many predicted attribute values satisfy the user's constraints to determine relevance. As discussed above, the binary trees serve to guide the active exemplar selection and reduce its computational overhead, rather than completely eliminate examples from consideration.

Referring now to FIG. 3B, in conjunction with FIGS. 1-2, in step 310, server 102 re-ranks the pool of database examples in response to the updating of the relevance ranking function.

In step 311, server 102 displays a top-ranked set of the re-ranked pool of database examples to the user of client device 101.

In step 312, a determination is made by server 102 as to whether an example(s) of the displayed set of top-ranked examples are acceptable to the user. For example, in the case of image search, the user may indicate that one or more of the images provided to the user is what the user has envisioned.

If an example(s) of the displayed set of top-ranked examples are acceptable to the user, then, in step 313, server 102 has identified an example(s) most relevant to the user.

If, however, the example(s) of the displayed set is not acceptable to the user, then server 102 predicts the information gain that would result from asking the user how the user's target image compares to each of the current pivot exemplars (each pivot exemplar for each binary tree) in step 303.

In some implementations, method 300 may include other and/or additional steps that, for clarity, are not depicted. Further, in some implementations, method 300 may be executed in a different order presented and that the order presented in the discussion of FIGS. 3A-3B is illustrative. Additionally, in some implementations, certain steps in method 300 may be executed in a substantially simultaneous manner or may be omitted.

Hence, as shown above, method 300 is more efficient over prior active relevance feedback methods (namely, those that require a naïve scan through all database images for each iteration) since the attribute search trees allow the method to limit the scan to just one example per attribute. As a result, a smaller number of candidates is analyzed per iteration. Furthermore, the system locates the user's target via a smaller number of well-chosen interactions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. This includes, but is not limited to, the particulars of how the relevance function is evaluated, how the information gain is computed, and how the attribute functions are learned or manually defined. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for efficiently identifying images, videos, audio files or documents relevant to a user using attribute binary trees for guiding relevance feedback, the method comprising:
constructing a binary search tree for each relative attribute of interest in a pool of database images, videos, audio files or documents;
setting a current pivot exemplar for each binary tree as corresponding to a database image, video, audio file or document with a median relative attribute value among all remaining database items in a subtree;
predicting an information gain that would result from asking a user how a user's target image, video, audio file or document compares to each pivot exemplar of a plurality of pivot exemplars, wherein said comparison is made in terms of an attribute associated with that pivot's binary tree;
providing a pivot exemplar deemed most informative from among said plurality of pivot exemplars to a user to provide a comparison between said attribute in said user's target image, video, audio file or document and in said current pivot exemplar; and
receiving, by a processor, comparative attribute feedback from said user regarding whether a degree of said attribute in said user's target image, video, audio file or document is more, less or equal with said attribute displayed in said provided pivot exemplar.

2. The method as recited in claim 1 further comprising:
updating relevance predictions on said pool of database images, videos, audio files or documents in response to receiving said comparative attribute feedback.

3. The method as recited in claim 2 further comprising:
re-ranking said pool of database images, videos, audio files or documents in response to updating said relevance predictions; and
displaying a top-ranked set of said re-ranked pool of database images, videos, audio files or documents.

4. The method as recited in claim 3 further comprising:
identifying an image, video, audio file or document relevant to said user in response to an image, video, audio file or document of said displayed top-ranked set of said re-ranked pool of database images, videos, audio files or documents being acceptable to said user.

5. The method as recited in claim 1 further comprising:
removing said current pivot exemplar from consideration in response to said comparative attribute feedback indicating said degree of said attribute in said user's target image, video, audio file or document is equal with said attribute displayed in said current pivot exemplar.

6. The method as recited in claim 1 further comprising:
moving said current pivot exemplar down one level in a binary tree for said attribute in response to said comparative attribute feedback indicating said degree of said attribute in said user's target image, video, audio file or document is more or less with said attribute displayed in said current pivot exemplar.

7. The method as recited in claim 6 further comprising:
replacing said current pivot exemplar with its child in said binary tree for said attribute in response to said comparative attribute feedback indicating said degree of said attribute in said user's target image, video, audio file or document is more or less with said attribute displayed in said current pivot exemplar.

8. The method as recited in claim 7 further comprising:
receiving additional comparative attribute feedback from said user regarding whether said degree of said attribute in said user's target image, video, audio file or document is more, less or equal with said attribute displayed in said current pivot exemplar's child.

9. A computer program product embodied in a computer readable storage medium for efficiently identifying images, videos, audio files or documents relevant to a user using attribute binary trees for guiding relevance feedback, the computer program product comprising the programming instructions for:
constructing a binary search tree for each relative attribute of interest in a pool of database images, videos, audio files or documents;
setting a current pivot exemplar for each binary tree as corresponding to a database image, video, audio file or document with a median relative attribute value among all remaining database items in a subtree;

predicting an information gain that would result from asking a user how a user's target image, video, audio file or document compares to each pivot exemplar of a plurality of pivot exemplars, wherein said comparison is made in terms of an attribute associated with that pivot's binary tree;

providing a pivot exemplar deemed most informative from among said plurality of pivot exemplars to a user to provide a comparison between said attribute in said user's target image, video, audio file or document and in said current pivot exemplar; and receiving comparative attribute feedback from said user regarding whether a degree of said attribute in said user's target image, video, audio file or document is more, less or equal with said attribute displayed in said provided pivot exemplar.

10. The computer program product as recited in claim 9 further comprising the programming instructions for:

updating relevance predictions on said pool of database images, videos, audio files or documents in response to receiving said comparative attribute feedback.

11. The computer program product as recited in claim 10 further comprising the programming instructions for:

re-ranking said pool of database images, videos, audio files or documents in response to updating said relevance predictions; and displaying a top-ranked set of said re-ranked pool of database images, videos, audio files or documents.

12. The computer program product as recited in claim 11 further comprising the programming instructions for:

identifying an image, video, audio file or document relevant to said user in response to an image, video, audio file or document of said displayed top-ranked set of said re-ranked pool of database images, videos, audio files or documents being acceptable to said user.

13. The computer program product as recited in claim 9 further comprising the programming instructions for:

removing said current pivot exemplar from consideration in response to said comparative attribute feedback indicating said degree of said attribute in said user's target image, video, audio file or document is equal with said attribute displayed in said current pivot exemplar.

14. The computer program product as recited in claim 9 further comprising the programming instructions for:

moving said current pivot exemplar down one level in a binary tree for said attribute in response to said comparative attribute feedback indicating said degree of said attribute in said user's target image, video, audio file or document is more or less with said attribute displayed in said current pivot exemplar.

15. The computer program product as recited in claim 14 further comprising the programming instructions for:

replacing said current pivot exemplar with its child in said binary tree for said attribute in response to said comparative attribute feedback indicating said degree of said attribute in said user's target image, video, audio file or document is more or less with said attribute displayed in said current pivot exemplar.

16. The computer program product as recited in claim 15 further comprising the programming instructions for:

receiving additional comparative attribute feedback from said user regarding whether said degree of said attribute in said user's target image, video, audio file or document is more, less or equal with said attribute displayed in said current pivot exemplar's child.

17. A system, comprising:

a memory unit for storing a computer program for efficiently identifying images, videos, audio files or documents relevant to a user using attribute binary trees for guiding relevance feedback; and a processor coupled to said memory unit, wherein said processor, responsive to said computer program, comprises:

circuitry for constructing a binary search tree for each relative attribute of interest in a pool of database images, videos, audio files or documents;

circuitry for setting a current pivot exemplar for each binary tree as corresponding to a database image, video, audio file or document with a median relative attribute value among all remaining database items in a subtree;

circuitry for predicting an information gain that would result from asking a user how a user's target image, video, audio file or document compares to each pivot exemplar of a plurality of pivot exemplars, wherein said comparison is made in terms of an attribute associated with that pivot's binary tree;

circuitry for providing a pivot exemplar deemed most informative from among said plurality of pivot exemplars to a user to provide a comparison between said attribute in said user's target image, video, audio file or document and in said current pivot exemplar; and circuitry for receiving comparative attribute feedback from said user regarding whether a degree of said attribute in said user's target image, video, audio file or document is more, less or equal with said attribute displayed in said provided pivot exemplar.

18. The system as recited in claim 17, wherein said processor further comprises:

circuitry for updating relevance predictions on said pool of database images, videos, audio files or documents in response to receiving said comparative attribute feedback.

19. The system as recited in claim 18, wherein said processor further comprises:

circuitry for re-ranking said pool of database images, videos, audio files or documents in response to updating said relevance predictions; and circuitry for displaying a top-ranked set of said re-ranked pool of database images, videos, audio files or documents.

20. The system as recited in claim 19, wherein said processor further comprises:

circuitry for identifying an image, video, audio file or document relevant to said user in response to an image, video, audio file or document of said displayed top-ranked set of said re-ranked pool of database images, videos, audio files or documents being acceptable to said user.

21. The system as recited in claim 17, wherein said processor further comprises:

circuitry for removing said current pivot exemplar from consideration in response to said comparative attribute feedback indicating said degree of said attribute in said user's target image, video, audio file or document is equal with said attribute displayed in said current pivot exemplar.

22. The system as recited in claim 17, wherein said processor further comprises:

circuitry for moving said current pivot exemplar down one level in a binary tree for said attribute in response to said comparative attribute feedback indicating said degree of said attribute in said user's target image, video, audio file or document is more or less with said attribute displayed in said current pivot exemplar.

23. The system as recited in claim 22, wherein said processor further comprises:
   circuitry for replacing said current pivot exemplar with its child in said binary tree for said attribute in response to said comparative attribute feedback indicating said degree of said attribute in said user's target image, video, audio file or document is more or less with said attribute displayed in said current pivot exemplar.

24. The system as recited in claim 23, wherein said processor further comprises:
   circuitry for receiving additional comparative attribute feedback from said user regarding whether said degree of said attribute in said user's target image, video, audio file or document is more, less or equal with said attribute displayed in said current pivot exemplar's child.

* * * * *